(12) United States Patent  
Lin et al.

(10) Patent No.: US 7,652,463 B2
(45) Date of Patent: Jan. 26, 2010

(54) POWER CONVERTER FOR COMPENSATING A MAXIMUM OUTPUT POWER

(75) Inventors: Chien Yuan Lin, Taipei (TW); Wen Yueh Tseng, Taipei (TW)

(73) Assignee: System General Corp, Taipei (TW)

( * ) Notice: Subject to any disclaimer, the term of this patent is extended or adjusted under 35 U.S.C. 154(b) by 194 days.

(21) Appl. No.: 11/967,254

(22) Filed: Dec. 30, 2007

(65) Prior Publication Data

US 2008/0309311 A1    Dec. 18, 2008

Related U.S. Application Data

(60) Provisional application No. 60/944,096, filed on Jun. 14, 2007.

(51) Int. Cl.
*H02M 3/335* (2006.01)

(52) U.S. Cl. .................. 323/288; 363/21.11; 363/21.18

(58) Field of Classification Search ................ 323/282, 323/283, 284, 285, 288; 363/20, 21.01, 21.04, 363/21.05, 21.1, 21.11, 21.12, 21.13, 21.18
See application file for complete search history.

(56) References Cited

U.S. PATENT DOCUMENTS

| | | | |
|---|---|---|---|
| 6,781,356 B1 * | 8/2004 | Yang et al. | 323/282 |
| 7,239,119 B2 * | 7/2007 | Baurle et al. | 323/284 |
| 7,453,250 B2 * | 11/2008 | Qiu et al. | 323/288 |
| 2008/0310193 A1 * | 12/2008 | Lin et al. | 363/21.18 |

* cited by examiner

*Primary Examiner*—Gary L Laxton
(74) *Attorney, Agent, or Firm*—Chun-Ming Shih

(57) ABSTRACT

A power converter for compensating a maximum output power includes a power switch, a control circuit, an oscillator and a frequency modulator. The control circuit generates a PWM signal in response to the pulse signal generated by the oscillator. The frequency modulator generates a second discharge signal to the oscillator for controlling the maximum output power of the power converter. The second discharge signal is decreased for prolonging a switching period of the PWM signal under a high-line voltage of the power converter.

6 Claims, 4 Drawing Sheets

POWER CONVERTER FOR COMPENSATING A MAXIMUM OUTPUT POWER

CROSS-REFERENCE

This application claims priority from U.S. Provisional Patent Application No. 60/944,096, filed on Jun. 14, 2007.

BACKGROUND OF THE INVENTION

1. Field of Invention

The present invention relates to a power converter, and more particularly, to a PWM controller having a frequency modulator used for compensating a maximum output power of a switching power converter.

2. Description of Related Art

Power converters are generally used to power many of electronic devices. The pulse-width modulation (PWM) technique is a conventional technology used in a power converter to control and regulate the output power. Various protection functions are built-in in the power converter to protect the power converter from permanent damage. The functions of compensating maximum output power are commonly used for overload and short-circuit protections.

FIG. 1 shows a circuit diagram of a traditional power converter used in prior art. The power converter comprises a power transformer $T_1$ having a primary winding $N_P$ and a secondary winding $N_S$. The power transformer $T_1$ is to provide galvanic isolation between an AC line input and an output of the power converter for safety. The primary winding $N_P$ is supplied with an input voltage $V_{IN}$ of the power converter. In order to regulate an output voltage $V_O$ of the power converter, a PWM controller coupled in series with the primary winding $N_P$ of the power transformer $T_1$ generates a PWM signal $V_{PWM}$ in response to a feedback signal $V_{FB}$. The PWM controller comprises an oscillator 10, a first comparator 31, a second comparator 32, a logic circuit 33, and a flip-flop 20. The PWM signal $V_{PWM}$ controls a power switch $Q_1$ to switch the power transformer $T_1$. A sense resistor $R_S$ is connected in series with the power switch $Q_1$ to determine the maximum output power of the power converter. The sense resistor $R_S$ turns the switching current of the transformer $T_1$ to a current signal $V_{CS}$. If the current signal $V_{CS}$ is greater than a maximum threshold $V_M$ through the first comparator 31, the PWM controller is coupled to disable the PWM signal $V_{PWM}$, and it also restricts the maximum output power of the power converter.

FIG. 2 shows the signal waveforms of the PWM signal and the current signal of the power converter in FIG. 1. As the PWM signal $V_{PWM}$ becomes logic-high, a primary-side switching current $I_P$ will be generated accordingly. A peak value $I_{P1}$ of the primary-side switching current $I_P$ can be given by, $$I_{P1} = \frac{V_{IN}}{L_P} \times T_{ON} \quad (1)$$

The maximum output power $P_O$ can be expressed by, $$P_O = \frac{L_P}{2 \times T_S} \times I_{P1}^2 = \frac{V_{IN}^2 \times T_{ON}^2}{2 \times L_P \times T_S} \quad (2)$$

In Equations (1) and (2), $L_P$ is the inductance of the primary winding $N_P$ of the transformer $T_1$, and $T_{ON}$ is an on-time of the PWM signal $V_{PWM}$ while the power switch $Q_1$ is switched on, and $T_S$ is the switching period of the PWM signal $V_{PWM}$.

From Equation (2), we find that the output power varies as the input voltage $V_{IN}$ varies. The input voltage $V_{IN}$ ranges between $90V_{AC}$ and $264V_{AC}$ when the safety regulations are taken into consideration, and wherein the power limit in high-line voltage is many times higher than the power limit in low-line voltage. There is a delay time $T_D$ from the moment the voltage in current signal $V_{CS}$ is higher than the maximum threshold $V_M$ to the moment the PWM signal $V_{PWM}$ is actually turned off. The maximum output power is also affected by the delay time $T_D$ of the PWM controller. In the period of the delay time $T_D$, the power switch $Q_1$ is still turned on, and it keeps on-status for delivering the output power. Therefore, the actual on-time of the PWM signal $V_{PWM}$ is equal to $T_{ON}+T_D$, and the actual maximum output power $P_O$ becomes as follows:

$$P_O = \frac{V_{IN}^2 \times (T_{ON} + T_D)^2}{2 \times L_P \times T_S} \quad (3)$$

Although the delay time $T_D$ is short, generally within the range of 200 nsec~350 nsec, the higher operating frequency and smaller switching period $T_S$, the more influential impact is caused by the delay time $T_D$. Therefore, the input voltage $V_{IN}$ should be compensated properly, such that the input voltage $V_{IN}$ does not affect the maximum output power.

SUMMARY OF THE INVENTION

An objective of the present invention is to provide a PWM controller for compensating the maximum output power of a power converter. A frequency modulator of the PWM controller can compensate the difference caused by the input voltage and the delay time, an identical output power limit for the low-line and high-line voltage input can be achieved.

The PWM controller comprises an oscillator, a control circuit, and a frequency modulator. The oscillator generates a pulse signal. The control circuit generates a PWM signal in response to the pulse signal. The frequency modulator generates a second discharge signal in response to the PWM signal, wherein a peak value of the second discharge signal decreases for prolonging a switching period of the PWM signal under high-line voltage to achieve an identical maximum output power.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
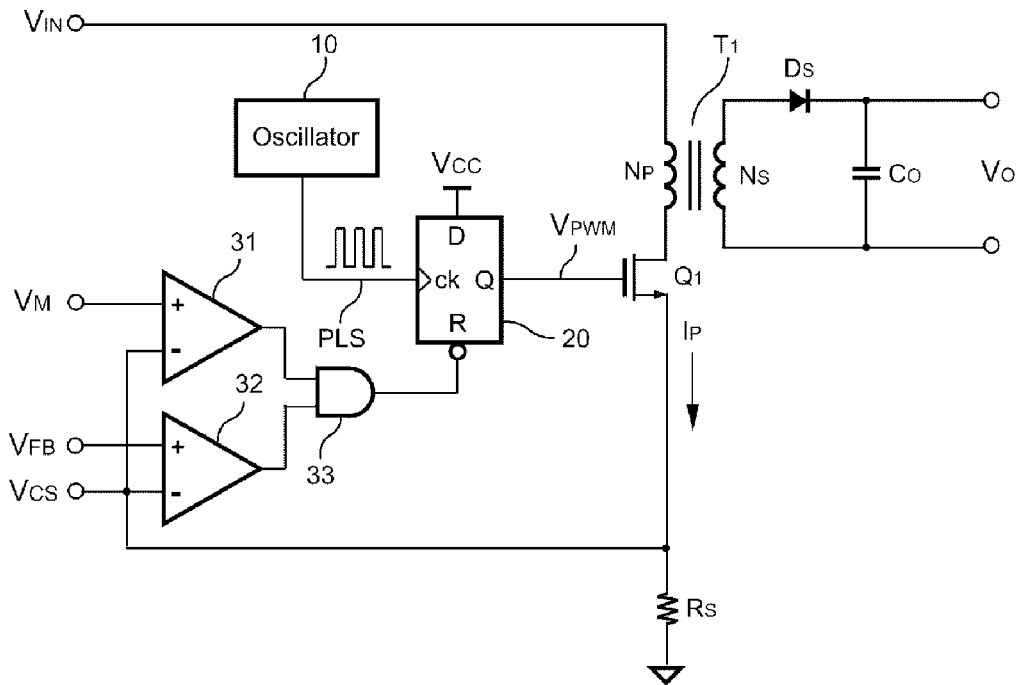
FIG. 1 shows a circuit diagram of a traditional power converter used in prior art.
Figure 2:
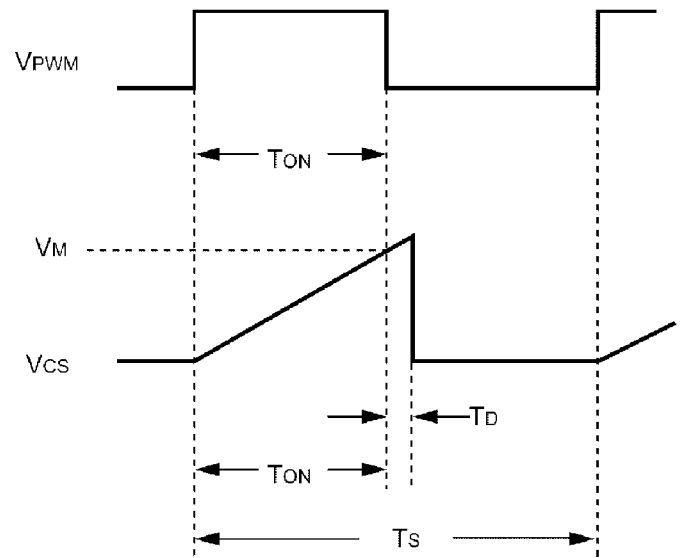
FIG. 2 shows the signal waveforms of the PWM signal and the current signal of the traditional power converter.
Figure 3:
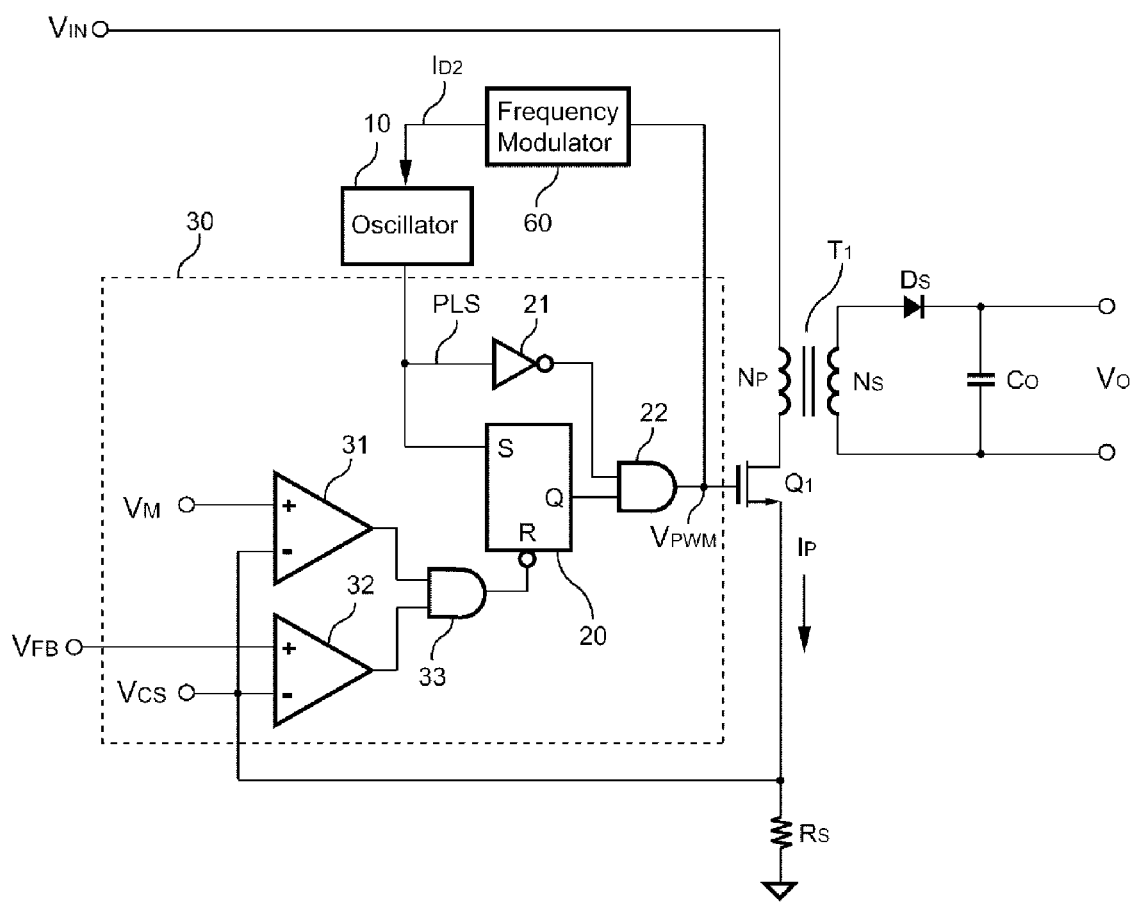
FIG. 3 is a power converter having a PWM controller in accordance with an embodiment of the present invention.

FIG. 3 is a power converter having a PWM controller in accordance with an embodiment of the present invention. The power transformer $T_1$ has a primary winding $N_P$ and a secondary winding $N_S$. The power transformer $T_1$ transfers the stored energy from the primary winding $N_P$ to the secondary winding $N_S$. A power switch $Q_1$ coupled to a primary winding $N_P$ of the power converter for switching the power transformer $T_1$. The primary winding $N_P$ of is supplied with an input voltage $V_{IN}$ of the power converter. A sense resistor $R_S$ is connected in series with the power switch $Q_1$ to convert the switching current $I_P$ of the transformer $T_1$ to a current signal $V_{CS}$, wherein the current signal $V_{CS}$ is coupled to the PWM controller.

Figure 4:
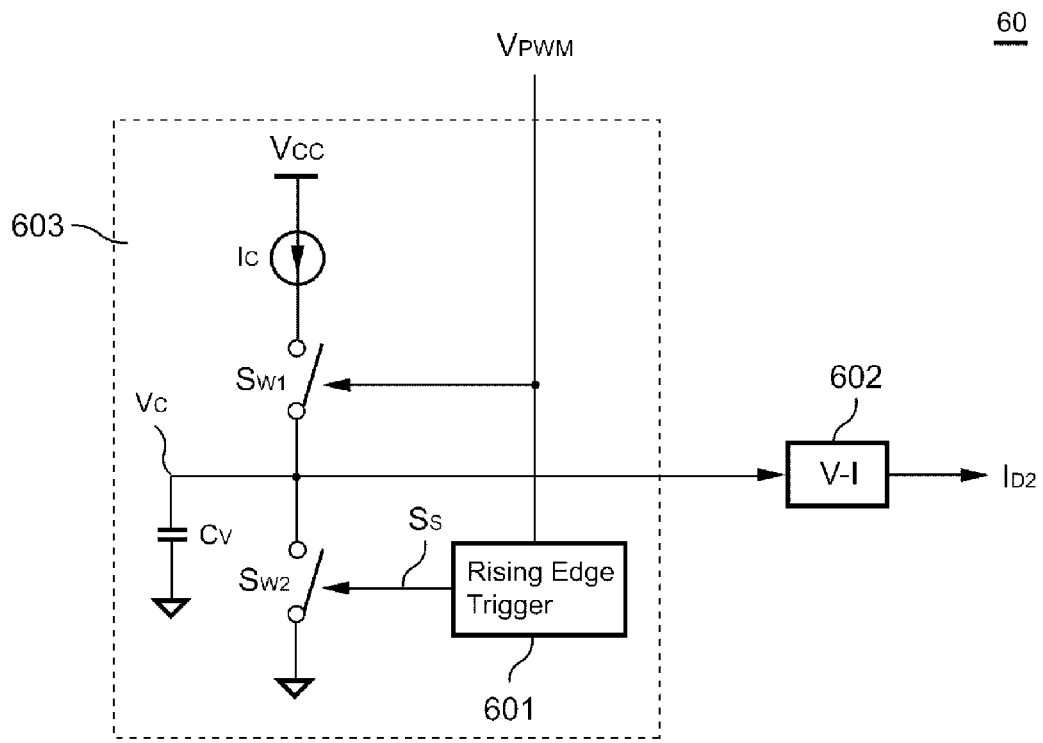
FIG. 4 is a circuitry block diagram of the frequency modulator in accordance with one embodiment of the present invention.

In one embodiment, the PWM controller comprises an oscillator 10, a control circuit 30 and a frequency modulator 60. The oscillator 10 generates a pulse signal PLS. A switching period of the pulse signal PLS is controlled by a first discharge signal $I_{D1}$ and a second discharge signal $I_{D2}$, and the first discharge signal $I_{D1}$ is correlated to an amplitude of a feedback signal $V_{FB}$ of the power converter (The detail descriptions are shown in FIG. 4). The control circuit 30 comprises a first comparator 31, a second comparator 32, a logic circuit 33, an inverter 21, an AND gate 22 and a flip-flop 20. The control circuit 30 is coupled to the oscillator 10 for generating a PWM signal $V_{PWM}$ in response to the pulse signal PLS, and the PWM signal $V_{PWM}$ controls the power switch $Q_1$.

A positive input terminal of the first comparator 31 is supplied with a maximum threshold $V_M$. The maximum threshold $V_M$ is a constant voltage in the embodiment. A negative input terminals of the first comparator 31 and the second comparator 32 receive the current signal $V_{CS}$. A positive input terminal of the second comparator 32 receives the feedback signal $V_{FB}$. The output terminals of the comparators 31 and 32 are coupled to input terminals of the logic circuit 33. An output terminal of the logic circuit 33 is coupled to a reset terminal R of the flip-flop 20. Furthermore, the pulse signal PLS is coupled to a set terminal S of the flip-flop 20 of the control circuit 30. An output terminal Q of the flip-flop 20 is connected to an input of the AND gate 22. Another input of the AND gate 22 receives the pulse signal PLS through the inverter 21. An output terminal of the AND gate 22 generates the PWM signal $V_{PWM}$. The flip-flop 20 is coupled to disable the PWM signal $V_{PWM}$ when the current signal $V_{CS}$ is greater than the maximum threshold $V_M$ or the current signal $V_{CS}$ is greater than the feedback signal $V_{FB}$ through the first comparator 31 and the second comparator 32, respectively.

The frequency modulator 60 is coupled to the control circuit 30 and the oscillator 10 for generating the second discharge signal $I_{D2}$ in response to the PWM signal $V_{PWM}$, wherein a peak value of the second discharge signal $I_{D2}$ is used to modulate the switching period of the PWM signal $V_{PWM}$. The decrease of the second discharge signal $I_{D2}$ is utilized to increase the switching period of the pulse signal PLS under a high-line voltage. In other words, the peak value of the second discharge signal $I_{D2}$ decreases for prolonging the switching period of the PWM signal $V_{PWM}$ to achieve an identical maximum output power for a low-line and high-line voltage.

FIG. 4 is a circuitry diagram of the frequency modulator 60 in accordance with one embodiment of the present invention. In the embodiment, the frequency modulator 60 comprises a saw-tooth circuit 603 and a voltage to current converter 602, wherein the saw-tooth circuit 603 comprises a charge circuit, a discharge switch $S_{W2}$ and a rising edge trigger 601. In the embodiment, a current source $I_C$, a charge switch $S_{W1}$ and a modulating capacitor $C_V$ develop the charge circuit. The charge circuit is coupled to the control circuit 30 (as shown in FIG. 3) for generating a saw-tooth signal $V_C$ at the modulating capacitor $C_V$ in response to the PWM signal $V_{PWM}$. The charge switch $S_{W1}$ is connected between the current source $I_C$ and the modulating capacitor $C_V$. The switch $S_{W1}$ is controlled by the PWM signal $V_{PWM}$. As the PWM signal $V_{PWM}$ becomes logic-high, the charge switch $S_{W1}$ is turned on, and the current source $I_C$ is coupled to charge the modulating capacitor $C_V$, the saw-tooth signal $V_C$ increases accordingly.

The rising edge trigger 601 is coupled to the discharge switch $S_{W2}$ and the control circuit 30 (as shown in FIG. 3) to generate a switch signal $S_S$ according to the rising edge of the PWM signal $V_{PWM}$. The discharge switch $S_{W2}$ is coupled to the charge circuit and controlled by the switch signal $S_S$. At the rising edge of the PWM signal $V_{PWM}$, the rising edge trigger 601 generates the switch signal $S_S$, and the discharge switch $S_{W2}$ is turned on to discharge the modulating capacitor $C_V$. Hence, the switch signal $S_S$ is utilized to control the discharge switch $S_{W2}$ for discharging the saw-tooth signal $V_C$ in the rising edge of the PWM signal $V_{PWM}$. The voltage to current converter 602 is coupled to the saw-tooth circuit 603 for converting the saw-tooth signal $V_C$ to the second discharge signal $I_{D2}$.

Figure 5:
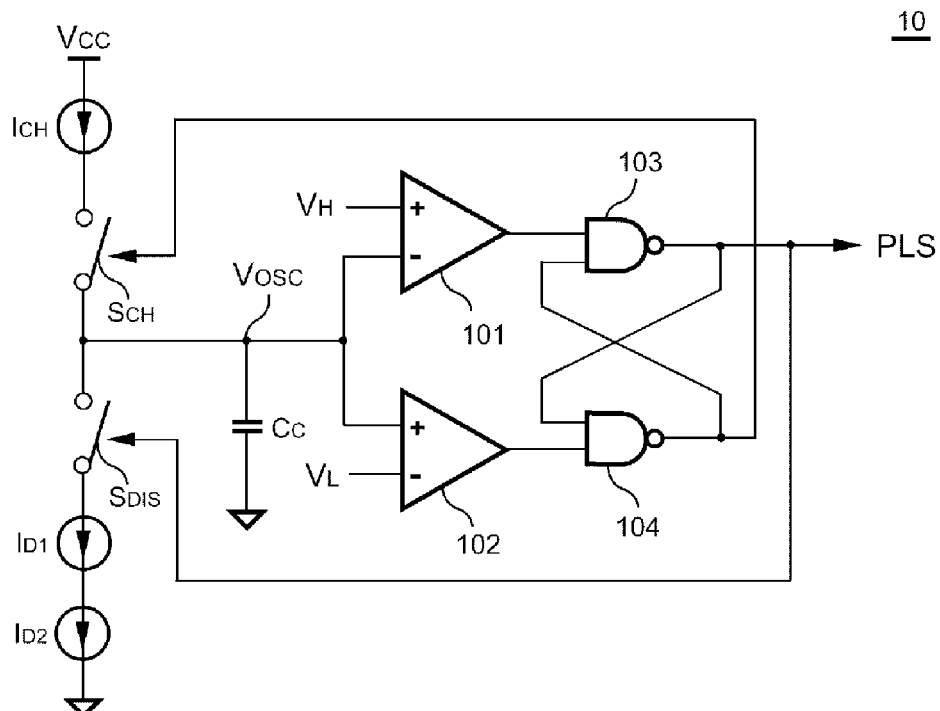
FIG. 5 is a circuitry block diagram of the oscillator in accordance with one embodiment of the present invention.

FIG. 5 is a circuitry diagram of the oscillator 10 in accordance with one embodiment of the present invention. In the embodiment, a charge switch $S_{CH}$ is connected between a charge current $I_{CH}$ and an oscillating capacitor $C_C$. The charge current $I_{CH}$ is used for charging the oscillating capacitor $C_C$ through the charge switch $S_{CH}$. The first discharge signal $I_{D1}$ and the second discharge signal $I_{D2}$ are connected in series with a discharge switch $S_{DIS}$. The discharge switch $S_{DIS}$ is connected to the charge switch $S_{CH}$ and the oscillating capacitor $C_C$. The first discharge signal $I_{D1}$ and the second discharge signal $I_{D2}$ are used for discharging the oscillating capacitor $C_C$ through the discharge switch $S_{DIS}$. The second discharge signal $I_{D2}$ is generated by the frequency modulator 60 (as shown in FIG. 3). The value of the second discharge signal $I_{D2}$ is correlated to the pulse-width of the PWM signal $V_{PWM}$. The first discharge signal $I_{D1}$ is correlated to an amplitude of the feedback signal $V_{FB}$ of the power converter.

Comparators 101, 102 and NAND gates 103, 104 develop the saw-tooth generator. The saw-tooth generator is coupled to the oscillating capacitor $C_C$. A positive input terminal of the comparator 101 receives a high trip-point voltage $V_H$. A negative input terminal of the comparator 102 receives a low trip-point voltage $V_L$. A negative input terminal of the comparator 101 and a positive terminal of the comparator 102 are connected to the oscillating capacitor $C_C$ for receiving an oscillating signal $V_{OSC}$. The output terminals of the comparators 101 and 102 are coupled to the NAND gates 103 and 104, respectively. An output terminal of NAND gate 103 generates the pulse signal PLS to control the discharge switch $S_{DIS}$. An output terminal of NAND gate 104 is used to control the charge switch $S_{CH}$.

The saw-tooth generator generates the pulse signal PLS in response to the oscillating signal $V_{OSC}$ at the oscillating capacitor $C_C$. When the charge switch $S_{CH}$ is turned on, the charge current $I_{CH}$ charges the oscillating capacitor $C_C$. The NAND gate 103 generates the pulse signal PLS to turn on the discharge switch $S_{DIS}$ once the oscillating signal $V_{OSC}$ reaches the high trip-point voltage $V_H$ of the comparator 101. When the discharge switch $S_{DIS}$ is turned on, the oscillating capacitor $C_C$ is discharged by the first discharge signal $I_{D1}$ and the second discharge signal $I_{D2}$. The oscillating capacitor $C_C$ will be discharged until the oscillating signal $V_{OSC}$ is lower than the low trip-point voltage $V_L$. Thus, the charge switch $S_{CH}$ and the discharge switch $S_{DIS}$ are controlled by the saw-tooth generator. The switching period of the pulse signal PLS is controlled by the first discharge signal $I_{D1}$ and the second discharge signal $I_{D2}$.

Figure 6:
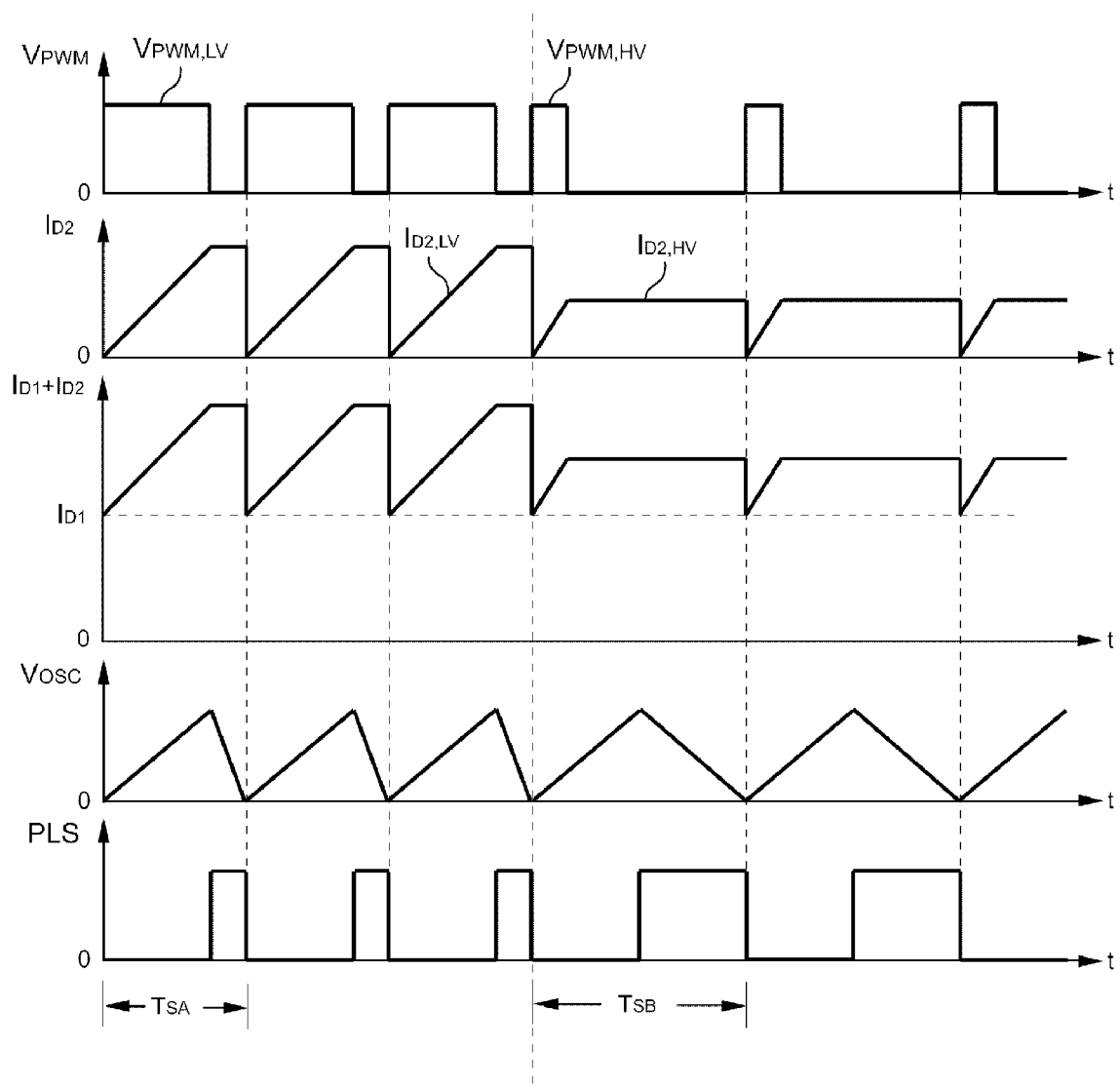
FIG. 6 illustrates the signal waveforms of the PWM controller under the high-line input voltage and the low-line input voltage in accordance with the present invention.

FIG. 6 illustrates the signal waveforms of the PWM controller under the high-line voltage and the low-line voltage in accordance with the present invention. As the PWM signal $V_{PWM}$ becomes logic-high, the second discharge signal $I_{D2}$ will be generated accordingly. The second discharge signal $I_{D2}$ is correlated to the pulse-width of the PWM signal $V_{PWM}$. The pulse-width of the PWM signal $V_{PWM,LV}$ under the low-line voltage is longer than the PWM signal $V_{PWM,HV}$ under the high-line voltage. Therefore, the peak value of the second discharge signal $I_{D2,LV}$ under the low-line voltage is greater than the second discharge signal $I_{D2,HV}$ under the high-line voltage.

The second discharge signal $I_{D2}$ is variable according to the low-line or high-line voltage. The falling slope of the oscillating signal $V_{OSC}$ under the high-line voltage is lower than the falling slope of the oscillating signal $V_{OSC}$ under the low-line voltage. Therefore, the peak value of the second discharge signal $I_{D2}$ decreases for prolonging the switching period of the PWM signal $V_{PWM}$. The switching period $T_{SB}$ of the pulse signal PLS under high-line voltage is longer than the switching period $T_{SA}$ of the pulse signal PLS under the low-line voltage.

Referring to the above equation (2), when the inductance $L_P$ and switching current $I_P$ are constant, the output power varies as the switching period $T_S$ varies. Accordingly, the difference of the maximum output power under the low-line voltage and high-line voltage can be minimized by adjusting the switching period of pulse signal PLS. In other words, the second discharge signal $I_{D2}$ is decreased to prolong the switching period of pulse signal PLS under high-line voltage, and it also restricts the maximum output power of the power converter. The identical maximum output power for the low-line and high-line voltage can be achieved.

What is claimed is:

1. A PWM controller for compensating a maximum output power of a power converter, comprising:
   an oscillator, generating a pulse signal, wherein a switching period of the pulse signal is controlled by a first discharge signal and a second discharge signal, and the first discharge signal is correlated to an amplitude of a feedback signal of the power converter;
   a control circuit, coupled to the oscillator for generating a PWM signal in response to the pulse signal, wherein the PWM signal controls a power switch; and
   a frequency modulator, coupled to the oscillator and the control circuit for generating the second discharge signal in response to the PWM signal, wherein a peak value of the second discharge signal is used to modulate a switching period of the PWM signal, and the peak value of the second discharge signal decreases for prolonging the switching period of the PWM signal to achieve an identical output power limit for the low-line and high-line input voltage.

2. The PWM controller of claim 1, wherein the frequency modulator comprises:
   a saw-tooth circuit, generating a saw-tooth signal in response to the PWM signal, wherein the saw-tooth signal is discharged in response to a rising edge of the PWM signal; and
   a voltage to current converter, coupled to the saw-tooth circuit for generating the second discharge signal in response to the saw-tooth signal.

3. The PWM controller of claim 2, wherein the saw-tooth circuit comprises:
   a charge circuit, coupled to the control circuit for generating the saw-tooth signal in response to the PWM signal;
   a discharge switch, coupled to the charge circuit; and
   a rising edge trigger, coupled to the discharge switch and the control circuit for generating a switch signal in response to the rising edge of the PWM signal, wherein the switch signal is utilized to control the discharge switch for discharging the saw-tooth signal in the rising edge of the PWM signal.

4. A power converter for compensating a maximum output power, comprising:
   a power switch, coupled to a primary winding of the power converter for switching a power transformer, and the power transformer is supplied with an input voltage of the power converter;
   an oscillator, generating a pulse signal, wherein a switching period of the pulse signal is controlled by a first discharge signal and a second discharge signal, and the first discharge signal is correlated to an amplitude of a feedback signal of the power converter;
   a control circuit, coupled to the oscillator for generating a PWM signal in response to the pulse signal, wherein the PWM signal controls the power switch; and
   a frequency modulator, coupled to the oscillator and the control circuit for generating the second discharge signal in response to the PWM signal, wherein a peak value of the second discharge signal is used to modulate a switching period of the PWM signal, and the peak value of the second discharge signal decreases for prolonging the switching period of the PWM signal to achieve an identical output power limit for the low-line and high-line input voltage.

5. The power converter of claim 4, wherein the frequency modulator comprises:
   a saw-tooth circuit, generating a saw-tooth signal in response to the PWM signal, wherein the saw-tooth signal is discharged in response to a rising edge of the PWM signal; and
   a voltage to current converter, coupled to the saw-tooth circuit for generating the second discharge signal in response to the saw-tooth signal.

6. The power converter of claim 5, wherein the saw-tooth circuit comprises:

a charge circuit, coupled to the control circuit for generating the saw-tooth signal in response to the PWM signal;

a discharge switch, coupled to the charge circuit; and a rising edge trigger, coupled to the discharge switch and the control circuit for generating a switch signal in response to the rising edge of the PWM signal, wherein the switch signal is utilized to control the discharge switch for discharging the saw-tooth signal in the rising edge of the PWM signal.

* * * * *